(12) United States Patent
Kurose et al.

(10) Patent No.: US 6,824,924 B1
(45) Date of Patent: Nov. 30, 2004

(54) ELECTRODE FOR NONAQUEOUS ELECTROLYTE BATTERY

(75) Inventors: Shigeo Kurose, Saku (JP); Tadayoshi Iijima, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/719,575

(22) PCT Filed: Jul. 5, 1999

(86) PCT No.: PCT/JP99/03640

§ 371 (c)(1),
(2), (4) Date: Jan. 2, 2001

(87) PCT Pub. No.: WO00/02280

PCT Pub. Date: Jan. 13, 2000

(30) Foreign Application Priority Data

Jul. 6, 1998 (JP) ............................................. 10-207208

(51) Int. Cl.⁷ ................................................ H01M 6/14
(52) U.S. Cl. .............................. 429/231.95; 429/218.1; 429/231.8; 29/623.3
(58) Field of Search ........................ 429/231.95, 231.8, 429/218.1, 231.1, 133, 164, 60, 137, 48; 29/623.3

(56) References Cited

U.S. PATENT DOCUMENTS

| | | | |
|---|---|---|---|
| 5,482,798 A | * | 1/1996 | Mototani et al. ............ 429/224 |
| 5,772,930 A | * | 6/1998 | Hashimoto et al. ............ 264/15 |
| 6,001,139 A | * | 12/1999 | Asanuma et al. ........... 29/623.3 |
| 6,136,471 A | * | 10/2000 | Yoshida et al. ........... 429/218.1 |

FOREIGN PATENT DOCUMENTS

| | | | | |
|---|---|---|---|---|
| EP | 0736918 A1 | 10/1996 | | |
| JP | 61127612 A | 6/1986 | | |
| JP | 62015761 A | 1/1987 | | |
| JP | 63301460 A | 12/1988 | | |
| JP | 63307662 A | 12/1988 | | |
| JP | 01105459 A | 4/1989 | | |
| JP | 02153810 A | 6/1990 | | |
| JP | 02252760 A | 10/1990 | | |
| JP | 04028159 A | 1/1992 | | |
| JP | 04215252 A | 8/1992 | | |
| JP | 06254422 A | 9/1994 | | |
| JP | 08167413 A | 6/1996 | | |
| JP | 08217434 A | 8/1996 | | |
| JP | 09035719 A | 2/1997 | | |
| JP | 09129216 A | 5/1997 | | |
| JP | 09129239 A | 5/1997 | | |
| JP | 09180720 A | 7/1997 | | |
| JP | 09180724 A | 7/1997 | | |
| JP | 09237624 A | 9/1997 | | |
| JP | 10092434 A | 4/1998 | | |
| JP | 10188993 A | 7/1998 | | |
| JP | 10-188993 | * | 7/1998 | ............ H01M/4/62 |
| JP | 10233205 A | 9/1998 | | |
| JP | 10255761 A | 9/1998 | | |
| JP | 11025986 A | 1/1999 | | |

* cited by examiner

Primary Examiner—Frankie L. Stinson
Assistant Examiner—Monique Wills
(74) Attorney, Agent, or Firm—Rader, Fishman & Grauer PLLC

(57) ABSTRACT

An electrolyte for a nonaqueous electrolyte battery having improved charge and discharge characteristics such as discharge capacity and charge/discharge cycle life and the like. The electrode comprises an electrode active material layer including at least a positive electrode active material, a conductive agent and a binder. The crushed, expanded graphite is used as the conductive agent. The crushed expanded graphite preferably has a median particle diameter of 0.1 to 40 μm. The quantity of the conductive agent in the electrode active material layer is preferably 0.1 to 15% by weight.

16 Claims, 1 Drawing Sheet

ELECTRODE FOR NONAQUEOUS ELECTROLYTE BATTERY

TECHNICAL FIELD

The present invention relates to an electrode for a nonaqueous electrolyte battery having an electrode active material layer including a positive electrode active material, a conductive agent and a binder. More particularly, it relates to an electrode for a nonaqueous electrolyte battery having improved change/discharge characteristics such as discharge capacity and charge/discharge cycle life and the like.

BACKGROUND ART

Recent development in the electronic field is marvelous and size reduction and weight reduction of video cameras, liquid crystal cameras, portable phones, lap top computers, word processors, and others are taking place. As a power source for these devices, there is an increasing demand for the development of batteries with reduced size and weight and having a high energy density.

Conventionally, lead batteries and nickel cadmium batteries have been used for these electronic devices. However, these have been failing to sufficiently meet the demand for size reduction, weight reduction, and higher energy density.

As a battery that meets these demands, development of a nonaqueous electrolyte secondary battery using metal lithium or a material capable of being doped and undoped with lithium as a negative electrode is taking place, and a battery using lithium cobalt oxide ($LiCcO_2$) as a positive electrode material is already put in practical use. Having characteristics of higher voltage and higher energy density as compared with conventional small secondary batteries, these batteries are highly expected as a driving power source for cordless devices, and a secondary battery can be fabricated with reduced size and weight as compared with the conventional batteries.

In order to achieve a further reduction of size, reduction of weight, and higher energy density, research and development of active materials and others is being eagerly carried out, and lithium nickel composite oxide $LiNiO_2$ is proposed as a positive electrode active material.

Here, in an electrode for a nonaqueous electrolyte battery, a conductive agent is used because of poor electric conductivity of active materials except for some of these.

For example, Japanese Laid-open Patent Publication No. Sho 62-15761/1987 discloses a nonaqueous electrolyte secondary battery using acetylene black as a conductive agent. Though having a large specific surface area, acetylene black is liable to assume an assembled state, so that the contact property between acetylene black and a positive electrode active material seems to be poor. For this reason, if acetylene black is used as a conductive agent, decrease in capacity is large by repeated charge/discharge operations.

If graphite is used, cycle characteristics are more easily obtained than acetylene black. However, the effect as a conductive agent will not be exhibited easily unless the amount of graphite to be used is increased, so that an electrode having a high capacity cannot be obtained. This seems to be due to that fact that, since the specific surface area of graphite is small, the contact surface between the conductive agent and the active material does not increase unless graphite is used in a large amount. For example, Japanese Laid-open Patent Publication No. Hel 1-105459/1989 discloses a nonaqueous z, electrolyte secondary battery comprising a positive electrode mainly made of $LiMn_2O_4$ and graphite, a negative electrode and a nonaqueous electrolyte, wherein the amount of graphite in the total amount of $LiMn_2O_4$ and graphite is 8 to 22% by weight. This means that, in order to use graphite as a conductive agent, the effect will not be exhibited unless graphite is added in a large amount.

Further, Japanese Laid-open Patent Publication No. Hei 4-215252/1992 discloses use of a scaly graphite as a conductive agent for a positive electrode in a nonaqueous electrolyte secondary battery.

Generally, the larger the amount of the conductive agent is, the more easily the performance of the active material can be drawn out. However, if a large amount of conductive agent is put into an electrode, the mass of active material per unit volume decreases, thereby leading to decrease in the capacity as a battery.

Further, the capacity of nonaqueous electrolyte secondary batteries decreases with repeated use. One of the factors for this deterioration of the secondary batteries seems to be due to the fact that electricity cannot be taken out to the outside because contact property between the active material and the conductive agent in the electrode becomes poor.

Therefore, it is desired to maintain a good contact property between the active material and the conductive agent in the electrode while reducing the amount of the conductive agent.

DISCLOSURE OF THE INVENTION

Objects of the Invention

Thus, in view of the aforesaid problems of the prior art, an object of the present invention is to provide an electrode for a nonaqueous electrolyte battery with improved charge/discharge characteristics such as discharge capacity and charge/discharge cycle life and the like.

SUMMARY OF THE INVENTION

The present inventors have made eager studies and found out that, with the use of crushed expanded graphite as a conductive agent, the performance of the active material can be drawn out with a smaller amount of the conductive agent, thereby completing the present invention.

Namely, the present invention is an electrode for a nonaqueous electrolyte battery, having an electrode active material layer including at least a positive electrode active material, a conductive agent and a binder, wherein at least a part of said conductive agent is a crushed expanded graphite.

In the present invention, the crushed expanded graphite preferably has a median particle diameter of 0.1 to 40 am.

In the present invention, the quantity of the conductive agent to be used in the electrode active material layer is preferably 0.1 to 15% by weight.

In the present invention, the positive electrode active material is, for example, a lithium composite oxide selected from the group consisting of $LiCoO_2$, $LiNiO_2$, $LiMn_2O_4$ and $Li_xNi_yM_zO_2$ (where x satisfies $0.8<x<1.5$, y+z satisfies $0.8<y+z<1.2$, and z satisfies $0 \leq z<0.35$; and M represents at least one kind of an element selected from Co, Mg, Ca, Sr, Al, Mn and Fe).

DETAILED DESCRIPTION OF THE INVENTION

Figure 1:
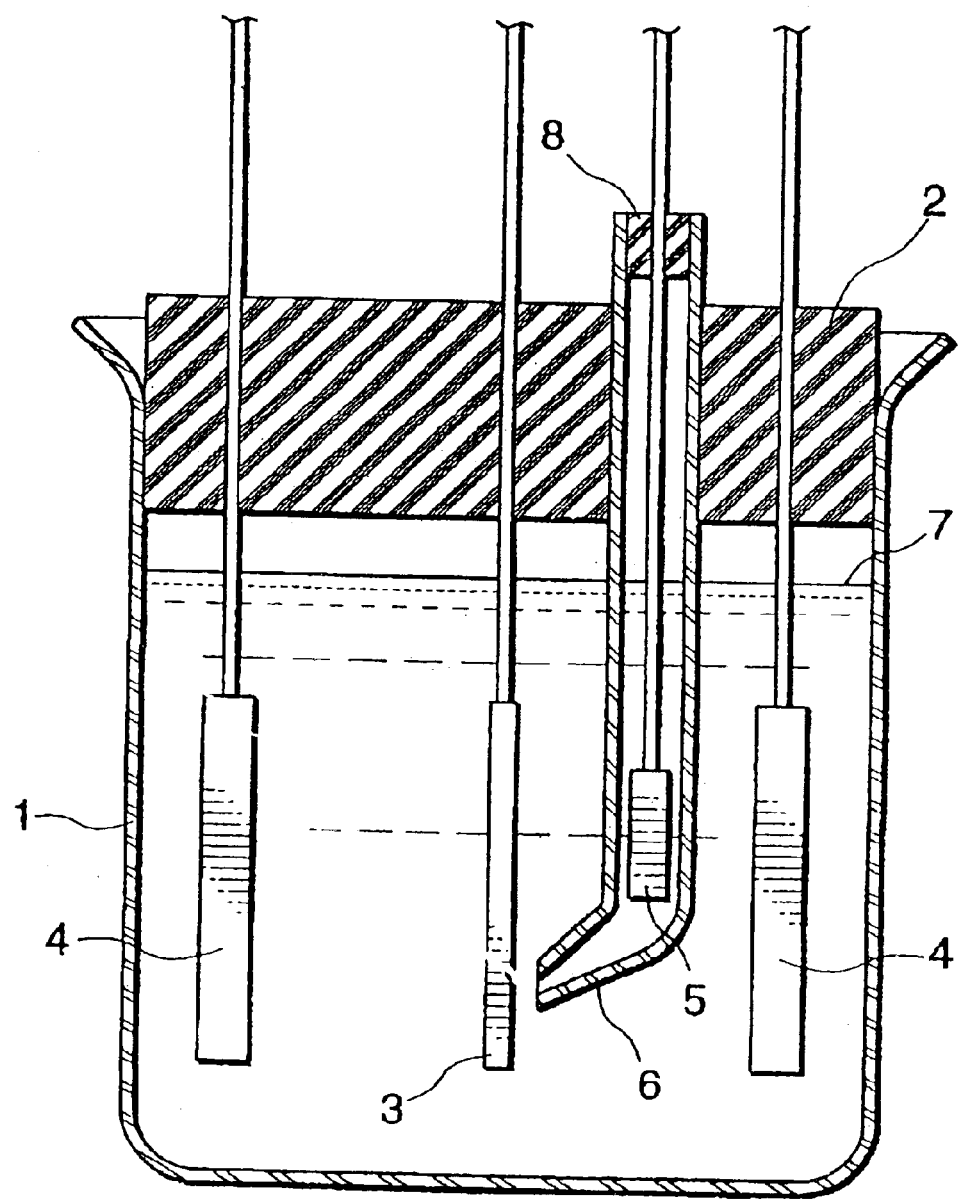
FIG. 1 is a schematic view of a cell for measuring the charge/discharge capacity, which was used in the Examples.

An electrode for a nonaqueous electrolyte battery of the present invention has an electrode active material layer including at least a positive electrode active material, a conductive agent and a binder.

In the present invention, crushed expanded graphite is used as the conductive agent. For this reason, the present invention has an advantage in that the effect is exhibited with a small amount of the conductive agent.

An example of a method for producing expanded graphite is a method shown in "Graphite Intercalation Compound" (ed. Nobuatsu Watanabe, Kindai Henshuu Sha), or the like. The aforesaid book mentions that the expanded graphite is produced through a process of treating powder of natural scaly graphite, thermally decomposed graphite, Kisch graphite, or the like with an inorganic acid such as concentrated sulfuric acid, nitric acid or selenic acid, and a strong oxidizing agent such as concentrated nitric acid, perchloric acid, perchlorate, permanganate, dichromate or hydrogen peroxide to produce a graphite intercalation compound, followed by washing with water, drying, a rapid heating treatment above several hundred OC, and other steps. Thus, the expanded graphite powder is expanded considerably by the rapid heating treatment, thereby to show a honeycomb structure.

It is shown that the crushing of the expanded graphite can be carried out by a method such as mentioned below. For example, Japanese Laid-open Patent Publication No. Sho 61-127612/1986 proposes a method of crushing in a state in which the voids in the expanded graphite are filled with liquid, or in a state in which the liquid is frozen. Japanese Laid-open Patent Publication No. Hei 2-153810/1990 proposes a method of crushing expanded graphite by dispersing the expanded graphite into liquid and allowing a supersonic wave to act on the inside of the liquid. Japanese Laid-open Patent Publication No. Hei 6-254422/1994 proposes a method of crushing expanded graphite by dispersing the expanded graphite into liquid and allowing spherical or rod-like medium to act on the inside of the liquid. Japanese Laid-open Patent Publication No. Hei 8-217434/1996 proposes a method of crushing expanded graphite by immersing the expanded graphite into liquid, then coarsely crushing the expanded graphite to obtain a graphite slurry, and crushing the slurry by means of a grinder having a rotary disk-like grindstone.

Further, Japanese Laid-open Patent Publication No Hei 9-35719/1997 gives a description on the use of expanded graphite, which has been subjected to wet grinding treatment, for an alkali manganese battery. In the Laid-open Publication, the expanded graphite is allowed to serve both as a conductive agent and as a binder. Also, the effect of the expanded graphite as a binder is shown.

In the present invention, the crushed expanded graphite is allowed to serve as a conductive agent, and a different binder is used. In primary batteries, only discharging is carried out; however, in secondary batteries, charging and discharging must be carried out. It has been found out that, in such a battery subjected to a repeated charging and discharging process, the relationship of the particle diameters between the active material and the conductive agent affects the cycle life.

Japanese Laid-open Patent Publication No. Sho 63301460/1988 discloses that, with regard to conductive agents, the larger effect is produced according as the particle diameter is smaller. Those having a small particle diameter have a large specific surface area and can produce a larger capacity, but has a poor cycle life. This seems to be because the contact between the conductive agents is deteriorated by a repeated charging and discharging process.

In the present invention, the crushed expanded graphite preferably has a median particle diameter of 0.1 to 40 $\mu$m, more preferably 0.1 to 20 $\mu$m. Here, the median particle diameter is measured with the use of a laser particle size analyzer such as Microtrack manufactured by Nikkiso Co. Ltd., and refers to the accumulated percent diameter at 50%.

The blending amount of the conductive agent is preferably 0.1 to 15% by weight, more preferably 1 to 10% by weight, in a dried coating layer, though it depends on the powder physical properties of the active material. If the amount is less than 0.1% by weight, the conductivity will be insufficient and liable to cause decrease of capacity. On the other hand, if it exceeds 15% by weight, the mass of the active material that is substantially acting will decrease, so that the capacity is liable to decrease as well.

The positive electrode active material for use in the present invention is not particularly limited. Specifically, however, lithium composite oxide such as $LiCoO_2$, $LiNiO_2$, $LiMn_2O_4$ and $Li_xNi_yM_zO_2$ (where x satisfies $0.8<x<1.5$, y+z satisfies $0.8<y+z<1.2$, and z satisfies $0 \leq z<0.35$; and M represents at least one kind of an element selected from Co, Mg, Ca, Sr, Al, Mn and Fe), may be mentioned. The pH of the active material is preferably not smaller than 9. Among these, $LiNiO_2$ and $Li_xN_yM_zO_2$ have a powder pH of strongly alkaline, and can get along well with the strong acidity of expanded graphite.

The median particle diameter of these lithium composite oxides is preferably 1.0 to 30.0 $\mu$m, more preferably 2.0 to 20.0 $\mu$m. The half-value width at the median particle diameter of the particle size distribution is preferably 2.0 to 10.0 Wm. Also, the ratio of the median particle diameter of the conductive agent to the median particle diameter of the active material is preferably 1/10 to 3.

The binder to be used in the present invention is one or a mixture of two or more of thermoplastic resins or polymers having a rubber elasticity. Examples of the binders to be used include fluorine-type polymers, polyvinyl alcohol, carboxymethyl cellulose, hydroxypropyl cellulose, regenerated cellulose, diacetyl cellulose, polyvinyl chloride, polyvinyl pyrrolidone, polyethylene, polypropylene, EPDM, sulfonated EPDM, SBR, polybutadiene, polyethylene oxide, and the like.

Among these, the fluorine-containing polymer preferably has an atomic ratio of fluorine atoms/carbon atoms in the range of 0.75 to 1.5, more preferably in the range of 0.75 to 1.3. If this value is larger than 1.5, it tends to be difficult to obtain a sufficient capacity of the battery. On the other hand, if it is smaller than 0.75, the binder is likely to be dissolved in the electrolytic solution.

Examples of such fluorine-containing polymers include polytetrafluoro-ethylene, polyvinylidene fluoride, vinylidene fluoride-ethylene trifluoride copolymers, ethylenetetrafluoroethylene copolymers, propylenetetrafluoroethylene copolymers, and the like. A fluorine-containing polymer with its hydrogen in the main chain substituted by an alkyl group(s) may be used as well.

Among these, those showing a selective solubility (having a low solubility in the electrolytic solution and being soluble in some solvents). For example, vinylidene fluoride-type polymers are only slightly soluble in a carbonate-type solvent that is used as the electrolytic solution or the like, but are soluble in a solvent such as N,N-dimethylformamide or N-methylpyrrolidone.

The amount of the binder to be blended is preferably 2 to 20% by weight, more preferably 3 to 15% by weight in a dried coating layer, although it depends on the specific surface areas and the particle size distributions of the active material and the conductive agent, the strength of the intended electrode, and the like.

Further, the solvent for the electrode active material mixture-coating material is not particularly limited, and general organic solvents can be used. Examples of the organic solvents include saturated hydrocarbons such as hexane, aromatic hydrocarbons such as toluene and xylene, alcohols such as methanol, ethanol, propanol and butanol, ketones such as acetone, methyl ethyl ketone, methyl isobutyl ketone, disobutyl ketone and cyclohexanone, esters such as ethyl acetate and butyl acetate, ethers such as tetrahydrofuran, dioxane and diethyl ether, amides such as N,N-dimethylformamide, N-methylpyrrolidone and N,N-dimethylacetamide, halogenated hydrocarbons such as ethylene chloride and chlorobenzene, and the like. Among these, amide-type solvents are preferable because they can dissolve the fluorine-containing polymers. These solvents may be used either alone or as a mixture of two or more thereof.

The electrode active material mixture-coating material can be fabricated by mixing an active material, a conductive agent, a binder, a solvent, and others by means of a hypermixer or the like. Further, the coating material may be subjected to a supersonic treatment for dispersion. In order that the active material and the conductive agent are uniformly mixed, the active material and the conductive agent may be subjected to a drying treatment in advance with the use of an angmill or the like. Further, the active material and the conductive agent may be mixed with a binder solution and kneaded with the use of a pressure-kneader or the like to prepare a coating material.

The collector for the electrode may be any electron conducting substance that does not undergo a chemical change in a constructed battery. For example, aluminum foil, stainless steel foil, nickel foil, and others having a thickness of 5 to 40 $\mu$m can be used.

The electrode active material mixture-coating material is applied onto the collector by a generally well-known application method such as the reverse roll method, direct roll method, blade method, knife method, extrusion method, curtain method, gravure roll method, bar coat method, dipping method, kiss coat method, squeeze method, and the like. Among these, the extrusion method is preferable, whereby a good surface state of a coating layer can be obtained by selecting the solvent composition of the coating material and the drying condition so that the coating material may be applied onto the collector at a speed of 5 to 100 m/min.

Here, the thickness, length, and width of the coating layer is determined by the final size of the battery to be obtained. The thickness of the coating layer is preferably adjusted by the ordinarily-adopted calendering-processing after the coating step. The processing pressure is preferably 0.2 to 10 t/cm, and the processing temperature is preferably 10 to 150° C.

MODES FOR CARRYING OUT THE INVENTION

Hereafter, the present invention will be more specifically described with reference to examples. However, the present invention is not limited by these examples.

EXAMPLE 1

An active material layer was fabricated as follows.

Into 45 parts by weight of NMP were dissolved 4 parts by weight of PVDF to prepare a binder solution. By means of a hypermixer, 90 parts by weight of the active material, 6 parts by weight of the conductive agent, and the aforesaid binder solution were mixed to obtain an active material mixture-coating material. The blending prescription is shown in Table 1.

TABLE 1

| Material | Parts by weight |
| --- | --- |
| Active material: LiCoO$_2$ (median particle diameter of 7.5 $\mu$m) C-010 manufactured by Seimi Chemical Co., Ltd. | 90 |
| Conductive agent: specially treated graphite (median particle diameter of 10 $\mu$m) crushed expanded graphite manufactured by Chuetsu Graphite Works Co., Ltd. | 6 |
| Binder: polyvinylidene fluoride (PVDF) | 4 |
| Solvent: N-methyl-2-pyrrolidone (NMP) | 45 |

The obtained coating material was applied onto one surface of a collector made of aluminum foil by means of a blade coater, and dried. Then, the same coating material was applied onto the rear surface and dried, followed by compression-molding with a roller press, and cutting into a predetermined size to obtain an electrode of Example 1.

EXAMPLE 2

An electrode of Example 2 was obtained by the same operations as in Example 1 except that specially treated graphite (crushed expanded graphite manufactured by Chuetsu Graphite Works Co., Ltd.) having a median particle diameter of 5 $\mu$m was used instead of the specially treated graphite (manufactured by Chuetsu Graphite Works Co., Ltd.) having a median particle diameter of 10 $\mu$m, as a conductive agent.

EXAMPLE 3

An electrode of Example 3 was obtained by the same operations as in Example 1 except that specially treated graphite (crushed expanded graphite manufactured by Chuetsu Graphite Works Co., Ltd.) having a median particle diameter of 20 $\mu$m was used instead of the specially treated graphite (manufactured by Chuetsu Graphite Works Co., Ltd.) having a median particle diameter of 10 $\mu$m, as a conductive agent.

COMPARATIVE EXAMPLE 1

An electrode of Comparative Example 1 was obtained by the same operations as in Example 1 except that artificial scaly graphite KS25 (manufactured by LONZA Co. Ltd.) having a median particle diameter of 11 mun was used instead of the specially treated graphite (manufactured by Chuetsu Graphite Works Co., Ltd.) having a median particle diameter of 10 $\mu$m, as a conductive agent.

Evaluation Method (Electrode Characteristics)

Each of the samples of Examples 1 to 3 and Comparative Example 1 was cut into a rectangular shape of 25 mm×20 mm. Then, an upper portion of the electrode layer was removed by a width of 5 mm to leave an electrode layer of 20 mm square. A stainless steel wire was spot-welded as a lead wire onto the upper portion of the electrode where the electrode layer was removed, thus preparing this electrode (working electrode).

A cell for measuring the charge/discharge capacities was prepared as shown in FIG. 1, and the charge/discharge operations were carried out in the following manner.

Namely, with reference to FIG. 1, in a beaker (1) were disposed a pair of counter electrodes (4) made of a lithium plate and connected to a stainless steel wire, a Capillary tube (6) having a similar reference electrode (5), and the electrode (working electrode) (3) as prepared above. The working electrode (3) was disposed in the middle of the two counter electrodes (4). An electrolytic solution (7) was prepared by dissolving 1 mol/L of lithium perchlorate as an electrolyte salt in a mixture solvent containing ethylene carbonate and diethyl carbonate at 1:1 (volume ratio). The beaker (1) and the Capillary tube (6) were sealed with silicon plugs (2) and (8), respectively, to prepare the cell for measurement.

The charge and discharge operations were carried out on this cell for five times with a constant current of 6 mA within the range from 3.0 V to 4.2 V (potential vs. Li/Li$^+$). The capacity at the first time of undoping and doping with Li ions was measured as the initial capacity. Also, the capacity at the fifth time was measured to determine the charge/discharge cycle characteristics. The above results are shown in Table

TABLE 2

| | Charging capacity (mAh/g) | Discharging capacity (mAh/g) | Discharging capacity at the fifth time (mAh/g) |
|---|---|---|---|
| Example 1 | 141 | 135 | 130 |
| Example 2 | 144 | 137 | 133 |
| Example 3 | 137 | 130 | 125 |
| Comparative Example 1 | 118 | 110 | 100 |

From Table 2, those of Examples 1 to 3 using crushed expanded graphite as a conductive agent showed improvements in the initial capacity and the cycle characteristics as compared with that of Comparative Example 1 using an ordinary artificial scaly graphite.

The present invention can be carried out in various other modes without departing from the spirit or essential characteristics thereof. Therefore, the aforesaid Examples are in all respects merely illustrative and must not be construed as being limitative. Further, the changes that belong to the equivalents of the claims are all comprised within the scope of the present invention.

INDUSTRIAL APPLICABILITY

According to the present Invention, since crushed expanded graphite is used as a conductive agent, an electrode for a nonaqueous electrolyte battery with improved charge/discharge characteristics such as discharge capacity and charge/discharge cycle life and the like can be obtained.

What is claimed is:

1. An electrode for a nonaqueous electrolyte battery, having an electrode active material layer including at least a positive electrode active material, a conductive agent and a binder, wherein
at least a part of said conductive agent is a crushed expanded graphite having a median particle diameter of 0.1 to 40 μm, the positive electrode active material is a lithium composite oxide having a median particle diameter of 1.0 to 30.0 μm, a ratio of the median particle diameter of the conductive agent to the median particle diameter of the positive electrode active material is ¹⁄₁₀ to 3, and the half-value width at the median particle diameter of the particle size distribution of the lithium composite oxide is 2.0 to 10.0 μm.

2. The electrode for a nonaqueous electrolyte battery according to claim 1, wherein the quantity of the conductive agent in the electrode active material layer is 0.1 to 15% by weight.

3. The electrode for a nonaqueous electrolyte battery according to claim 1, wherein the positive electrode active material is a lithium composite oxide selected from the group consisting of $LiCoO_2$, $LiNiO_2$, $LiMn_2O_4$ and $Li_xNi_yM_zO_2$ (where x satisfies 0.8<x 1.5, y+z satisfies 0.8<y+z<1.2, and z satisfies 0≦z<0.35; and M represents at least one kind of an element selected from Co, Mg, Ca, Sr, Al, Mn and Fe).

4. An electrode for a nonaqueous electrolyte secondary battery, having an electrode active material layer including at least a positive electrode active material, a conductive agent and a binder, wherein
at least a part of said conductive agent is a crushed expanded graphite having a median particle diameter of 0.1 to 40 μm, the positive electrode active material is a lithium composite oxide having a median particle diameter of the lithium composite oxide is 1.0 to 30.0 μm and a ratio of the median particle diameter of the conductive agent to the median particle diameter of the positive electrode active material is ¹⁄₁₀ to 3, and the half-value width at the median particle diameter of the particle size distribution of the lithium composite oxide is 2.0 to 10.0 μm.

5. The electrode for nonaqueous electrolyte secondary battery according to claim 4, wherein the quantity of the conductive agent in the electrode active material layer is 0.1 to 15% by weight.

6. The electrode for a nonaqueous electrolyte secondary battery according to claim 4, wherein the positive electrode active material is a lithium composite oxide selected from the group consisting of $LiCoO_2$, $LiNiO_2$, $LiMn_2O_4$ and $Li_xNi_yM_zO_2$ (where x satisfies 0.8<x<1.5, y+z satisfies 0.8<y+z<1.2, and z satisfies o≦Z<0.35; and M represents at least one kind of an element selected from Co, Mg, Ca, Sr, Al, Mn and Fe).

7. The electrode for a nonaqueous electrolyte battery according to claim 1, wherein a quantity of said binder is 2 to 20% by weight in a dried coating layer.

8. The electrode for a nonaqueous electrolyte battery according to claim 4, wherein a quantity of said binder is 2 to 20% by weight in a dried coating layer.

9. An electrode for a nonaqueous electrolyte battery, having an electrode active material layer including at least a positive electrode active material, a conductive agent and a binder, wherein at least a part of said conductive agent is a crushed expanded graphite having a median particle diameter of 0.1 to 40 μm, the positive electrode active material is a lithium composite oxide of $Li_xNi_yM_zO_2$ (where x satisfies 0.8<x<1.5, y+z satisfies 0.8<y+z<1.2, and z satisfies 0≦z<0.35; and M represents at least one kind of an element selected from Co, Mg, Ca, Sr, Al, Mn and Fe), a ratio of the median particle diameter of the conductive agent to the median particle diameter of the positive electrode active material is ¹⁄₁₀ to 3, and the half-value width at the median particle diameter of the particle size distribution of the lithium composite oxide is 2.0 to 10.0 μm.

10. The electrode for a nonaqueous electrolyte battery according to claim 9, wherein the quantity of the conductive agent in the electrode active material layer is 0.1 to 15% by weight.

11. The electrode for a nonaqueous electrolyte battery according to claim 9, wherein a quantity of said binder is 2 to 20% by weight in a dried coating layer.

12. The electrode for a nonaqueous electrolyte battery according to claim 9, wherein a median particle diameter of the lithium composite oxide is 1.0 to 30.0 μm.

13. An electrode for a nonaqueous electrolyte secondary battery, having an electrode active material layer including at least a positive electrode active material, a conductive agent and a binder, wherein at least a part of said conductive agent is a crushed expanded graphite having a median particle diameter of 0.1 to 40 μm, the positive electrode active material is a lithium composite oxide of $Li_xNi_yM_zO_2$ (where x satisfies 0.8<x<1.5, y+z satisfies 0.8<y+z<1.2, and z satisfies 0≦z<0.35; and M represents at least one kind of an element selected from Co, Mg, Ca, Sr, Al, Mn and Fe), a ratio of the median particle diameter of the conductive agent to the median particle diameter of the positive electrode active material is 1/10 to 3, and the half-value width at the median particle diameter of the particle size distribution of the lithium composite oxide is 2.0 to 10.0 μm.

14. The electrode for a nonaqueous electrolyte battery according to claim 13, wherein the quantity of the conductive agent in the electrode active material layer is 0.1 to 15% by weight.

15. The electrode for a nonaqueous electrolyte battery according to claim 13, wherein a quantity of said binder is 2 to 20% by weight in a dried coating layer.

16. The electrode for a nonaqueous electrolyte battery according to claim 13, wherein a median particle diameter of the lithium composite oxide is 1.0 to 30.0 μm.

* * * * *